US009560870B2

(12) United States Patent
Schultz et al.

(10) Patent No.: US 9,560,870 B2
(45) Date of Patent: Feb. 7, 2017

(54) LOW CALORIE DRINK TABLET

(71) Applicant: Intercontinental Great Brands LLC, East Hanover, NJ (US)

(72) Inventors: Hayley Schultz, New York, NY (US); Maria Del Pilar I. Cobos, Port Chester, NY (US); Paul Leis, West Chester, OH (US)

(73) Assignee: INTERCONTINENTAL GREAT BRANDS LLC, Exeter, NJ (US)

( * ) Notice: Subject to any disclaimer, the term of this patent is extended or adjusted under 35 U.S.C. 154(b) by 0 days.

(21) Appl. No.: 14/374,772

(22) PCT Filed: Jan. 25, 2013

(86) PCT No.: PCT/US2013/023241
§ 371 (c)(1),
(2) Date: Jul. 25, 2014

(87) PCT Pub. No.: WO2013/116112
PCT Pub. Date: Aug. 8, 2013

(65) Prior Publication Data
US 2015/0017310 A1  Jan. 15, 2015

Related U.S. Application Data

(60) Provisional application No. 61/593,672, filed on Feb. 1, 2012.

(51) Int. Cl.
*A23L 2/40* (2006.01)
*A23L 2/395* (2006.01)

(52) U.S. Cl.
CPC .............. *A23L 2/40* (2013.01); *A23L 2/395* (2013.01); *A23V 2002/00* (2013.01)

(58) Field of Classification Search
CPC ........ A23L 1/0026; A23L 2/40; A61K 9/0095
USPC .......... 426/74, 591, 601, 573, 454, 477, 804
See application file for complete search history.

(56) References Cited

U.S. PATENT DOCUMENTS

| | | | |
|---|---|---|---|
| 2,984,543 A * | 5/1961 | Smith ................ | A23L 2/40 423/268 |
| 3,082,091 A | 3/1963 | Smith et al. | |
| 3,359,119 A | 12/1967 | Milton | |
| 3,518,343 A | 6/1970 | Palermo et al. | |
| 3,518,344 A | 6/1970 | Tomaich et al. | |
| 3,667,962 A | 6/1972 | Fritzberg et al. | |
| 4,384,005 A * | 5/1983 | McSweeney ........ | A23L 1/0026 264/124 |
| 5,114,647 A | 5/1992 | Levesque et al. | |
| 5,171,571 A | 12/1992 | Stephan et al. | |
| 5,302,396 A | 4/1994 | Phadke et al. | |
| 5,468,504 A | 11/1995 | Schaeffer | |
| 5,480,652 A | 1/1996 | Bru-Magntez et al. | |
| 5,503,846 A | 4/1996 | Wehling et al. | |
| 5,527,540 A | 6/1996 | Gergely et al. | |
| 5,707,654 A | 1/1998 | Beres et al. | |
| 5,762,951 A | 6/1998 | Maasz et al. | |
| 5,792,473 A | 8/1998 | Gergely et al. | |
| 5,853,785 A | 12/1998 | Nayyar et al. | |
| 5,855,948 A | 1/1999 | Mills et al. | |
| 5,888,544 A | 3/1999 | Gergely et al. | |
| 5,912,012 A | 6/1999 | Carlin et al. | |
| 6,066,335 A | 5/2000 | Machoczek | |
| 6,162,474 A | 12/2000 | Chen et al. | |
| 6,242,002 B1 | 6/2001 | Tritthart et al. | |
| 6,426,111 B1 | 7/2002 | Hirsch | |
| 6,544,557 B2 | 4/2003 | Selim | |
| 8,053,007 B2 | 11/2011 | Innocenzi | |
| 2001/0051134 A1 | 12/2001 | Pandya | |
| 2002/0001656 A1 | 1/2002 | Mason et al. | |
| 2007/0059362 A1 | 3/2007 | Rau | |
| 2007/0275118 A1 * | 11/2007 | Van Laere ........... | A61K 31/715 426/2 |
| 2010/0112158 A1 | 5/2010 | Abelyan et al. | |
| 2011/0212246 A1 | 9/2011 | Debon et al. | |
| 2011/0281008 A1 | 11/2011 | Gootenilleke et al. | |
| 2011/0318465 A1 * | 12/2011 | Gootenilleke ......... | A23C 9/133 426/540 |

FOREIGN PATENT DOCUMENTS

| | | |
|---|---|---|
| CN | 1457704 | 11/2003 |
| CN | 101317976 | 12/2008 |
| CN | 101455337 | 6/2009 |
| CN | 101455694 | 6/2009 |
| CN | 101662944 | 3/2010 |
| CN | 101669642 | 3/2010 |
| CN | 101933909 | 1/2011 |
| CN | 101953504 | 1/2011 |
| EP | 0418564 | 3/1991 |
| EP | 0424706 | 5/1991 |
| EP | 1426043 | 6/2004 |
| EP | 1531691 | 5/2008 |
| EP | 1622584 | 5/2008 |
| EP | 1585502 | 6/2011 |
| WO | 2007137218 | 11/2007 |
| WO | 2011133911 | 10/2011 |
| WO | 2013116112 | 8/2014 |

OTHER PUBLICATIONS

The International Preliminary Report on Patentability for International Application PCT/US2013/023241, dated Aug. 5, 2014, 6 pages.
The International Search Report for International Application PCT/US2013/023241, dated Mar. 22, 2013, 2 pages.
The Written Opinion for International Application PCT/US2013/023241, dated Mar. 22, 2013, 5 pages.
The Extended European Search Report for Patent No. 13744206.7, dated Oct. 21, 2015.
Chinese Patent Application No. 201380007105.3, Notification of First Office Action, dated Nov. 4, 2015, 21 pages.

* cited by examiner

*Primary Examiner* — Helen F Heggestad
(74) *Attorney, Agent, or Firm* — Morgan, Lewis & Bockius LLP

(57) ABSTRACT

A beverage tablet comprising an effervescent system including a base selected from one or more carbonates, bicarbonates, or combinations thereof, where the base is present in an amount of about 5 wt % to about 40 wt % of the tablet; and where the tablet self-disperses in an aqueous liquid in less than about three minutes to produce a beverage.

12 Claims, No Drawings

LOW CALORIE DRINK TABLET

CROSS-REFERENCE TO RELATED APPLICATIONS

The present application is a U.S. National Stage Entry of International Patent Application No. PCT/US2013/023241, filed 25 Jan. 2013, which in turn claims priority benefit from U.S. Provisional Patent Application No. 61/593,672, filed 01 Feb. 2012, all of which are hereby incorporated by reference in their entireties.

BACKGROUND OF THE INVENTION

The present invention generally relates to compositions and methods for a low calorie drink tablet which may be formulated to be self-mixing due to a bicarbonate system, low calorie, and provide a beverage with a desirable mouthfeel.

BRIEF SUMMARY OF THE INVENTION

According to some embodiments of the present invention, a beverage tablet includes an effervescent system containing a base selected from one or more carbonates, bicarbonates, or combinations thereof, wherein the base is present in an amount of about 5 wt % to about 40 wt % of the tablet. In some embodiments, the tablet self-disperses in an aqueous liquid in less than about three minutes to produce a beverage.

In some embodiments, the beverage includes potassium and/or sodium in an amount of less than about 200 mg per sodium. The beverage may be a low calorie beverage, and may exhibit a texture and/or mouthfeel traditionally associated with a sugar-sweetened or juice-containing beverage.

In certain embodiments, the beverage tablet includes a lubricant, such as corn oil, in an amount of about 0.1 wt % to about 8 wt % of the tablet. In some embodiments, the beverage tablet includes a texturizing agent, such as carboxymethylcellulose, in an amount of about 0.1 wt % to about 10 wt % of the tablet.

In some embodiments, a beverage may be prepared by adding the drink tablet to an aqueous liquid.

According to some embodiments, a method of preparing a beverage tablet includes combining an effervescent system containing (a) one or more carbonates, bicarbonates, or combinations thereof, wherein the base is present in an amount of about 5 wt % to about 40 wt % of the tablet; (b) a lubricant in an amount of about 0.1 wt % to about 8 wt % of the tablet; and (c) a texturizing agent in an amount of about 0.1 wt % to about 10 wt % of the tablet; to prepare a beverage tablet.

DETAILED DESCRIPTION OF THE INVENTION

Methods and compositions of the present invention relate to tablets including an effervescent system, a lubricant, and a texturizing agent. In some embodiments, methods and compositions of the present invention relate to tablets containing an effervescent system of acid and carbonate/bicarbonate, which in the presence of an aqueous liquid such as water, reacts to form a low calorie beverage with a desirable mouth-feel. As used herein, a low calorie beverage is defined by the standard set by the United States Food and Drug Administration of less than 40 calories per serving. In some embodiments, the tablet dissolves to a clear solution in an aqueous liquid such that there are no visible particulates floating in the resulting composition after the tablet has dissolved in the aqueous liquid. A clear solution can exhibit a color. In other embodiments, the tablet dissolves in an aqueous liquid such that no large particles are floating or settle as sediment.

In some embodiments, tablets of the present invention may include a combination of components which work inter-dependently to provide the desired characteristics of self-mixing, a low calorie beverage, low sodium and/or potassium, and a desirable mouthfeel. For example, in one embodiment, use of a highly-functioning oil lubricant may allow for the inclusion of lower levels of the oil lubricant itself and/or of binders such as sorbitol while still achieving the desired properties of machinability and tablet formation generally associated with higher levels of lubricant. Inclusion of lower levels of lubricant and/or binder may in turn result in a decreased dissolution time of the tablet in an aqueous liquid. The decreased dissolution time of the tablet in the aqueous liquid resulting from the choice of oil lubricant may therefore allow for lower levels of a bicarbonate system while still achieving the desired self-mixing effect usually associated with a higher level of bicarbonate system, and therefore a lower sodium and/or potassium content in the resulting beverage. Similarly, inclusion of a texturizing agent which is effective in achieving the desired mouthfeel in the final beverage, but which is also quick to dissolve in an aqueous liquid (for example, carboxymethylcellulose), permits a bicarbonate system to be included at a lower level while still achieving the desired self-mixing effect usually associated with a higher level of bicarbonate system. For example, in one embodiment, a tablet including an acid/bicarbonate effervescent system, a corn oil lubricant, and a high viscosity carboxymethylcellulose texturizing agent demonstrates self-mixing in an aqueous liquid in less than three minutes, and provides a resulting beverage containing less than 200 mg of sodium per serving, less than 40 calories per serving, and which has a desirable mouthfeel such as that of a sugar-sweetened or juice-containing beverage.

Effervescent System

Tablets of some embodiments of the present invention include an effervescent system. A suitable effervescent system may be formulated and included in a tablet in an amount such that when the tablet is in the presence of an aqueous liquid, the effervescent system helps to disperse and dissolve the tablet and components contained therein. In some embodiments, a suitable effervescent system may be formulated and included in a tablet in an amount such that when the tablet is in the presence of an aqueous liquid, the effervescent system completely disperses and dissolves the tablet and components contained therein without stirring.

In some embodiments, an effervescent system includes an acid and a base. The effervescent system may be activated when contacted with an aqueous liquid, e.g., when the effervescent system is placed in a glass of water. In such a system, the aqueous liquid liberates the acid and base and enables the acid and base to react with each other to produce a gas (e.g., carbon dioxide).

Suitable acids may include but are not limited to citric acid, aspartic acid, malic acid, adipic acid, tartaric acid, fumaric acid, succinic acid, sodium acid pyrophosphate, lactic acid, hexamic acid, amino acid hydrochlorides, and acid salts and acid anhydrides thereof, and mixtures thereof. A tablet of some embodiments of the present invention may include an acid in any amount suitable to achieve the desired effervescent and taste characteristics in the tablet and resulting beverage. In some embodiments, a tablet includes acid in an amount of about 10 wt % to about 70 wt % of the tablet; about 20 wt % to about 60 wt % of the tablet; about 30 wt % to about 50 wt % of the tablet; about 10 wt % of the tablet; about 20 wt % of the tablet; about 30 wt % of the tablet; about 40 wt % of the tablet; about 50 wt % of the tablet; about 60 wt % of the tablet; or about 70 wt % of the tablet.

The base of the effervescent system preferably is capable of generating a gas such as carbon dioxide in the presence of an acid source and an aqueous liquid. Examples of suitable bases include but are not limited to potassium bicarbonate, sodium bicarbonate, sodium carbonate, sodium sesquicarbonate, potassium carbonate, calcium carbonate, magnesium carbonate, zinc carbonate, and mixtures thereof. A tablet of some embodiments of the present invention may include a base in any amount suitable to achieve the desired effervescent and taste characteristics in the tablet and resulting beverage. In some embodiments, a tablet can include one or more bases in an amount of about 1 wt % to about 50 wt % of the tablet; about 1 wt % to about 45 wt % of the tablet; about 5 wt % to about 40 wt % of the tablet; about 10 wt % to about 35 wt % of the tablet; about 15 wt % to about 30 wt % of the tablet; about 20 wt % to about 25 wt % of the tablet; about 1 wt % of the tablet; about 5 wt % of the tablet; about 10 wt % of the tablet; about 15 wt % of the tablet; about 20 wt % of the tablet; about 25 wt % of the tablet; about 30 wt % of the tablet; about 35 wt % of the tablet; about 40 wt % of the tablet; about 45 wt % of the tablet; or about 50 wt % of the tablet.

Lubricant

Tablets of the present invention may include a lubricant. Tablet formulations may include lubricant of a type and amount suitable to improve overall machinability in preparing the tablet. A lubricant may improve machinability, for example, by enabling the formulation to be tableted without sticking to the tablet press or creating other tableting problems. In some embodiments, lubricants may work in conjunction with binders to produce well-formed tablets.

Suitable lubricants may include but are not limited to oils such as wheat germ oil, canola oil, safflower oil, sunflower seed oil, sesame oil, cotton seed oil, corn oil, palm oil, coconut oil, flax seed oil, olive oil, mineral oil, and combinations thereof. In some embodiments, a preferred lubricant is corn oil.

In some embodiments, an oil lubricant may be included in an amount of about 0.1 wt % to about 10 wt % of the tablet; about 0.1 wt % to about 8 wt % of the tablet; about 0.1 wt % to about 6 wt % of the tablet; about 0.1 wt % to about 4 wt % of the tablet; about 0.1 wt % to about 2 wt % of the tablet; about 0.1 wt % to about 1 wt % of the tablet; about 0.1 wt % of the tablet; about 0.2 wt % of the tablet; about 0.3 wt % of the tablet; about 0.4 wt % of the tablet; about 0.5 wt % of the tablet; about 0.6 wt % of the tablet; about 0.7 wt % of the tablet; about 0.8 wt % of the tablet; about 0.9 wt % of the tablet; about 1 wt % of the tablet; about 2 wt % of the tablet; about 4 wt % of the tablet; about 6 wt % of the tablet; about 8 wt % of the tablet; or about 10 wt % of the tablet.

The composition optionally includes additional lubricants including, e.g., water insoluble, water dispersible, and water soluble lubricants, and combinations thereof. Examples of useful water soluble lubricants include sodium benzoate, magnesium stearate, polyethylene glycol, L-leucine, adipic acid, and combinations thereof. An example of a useful class of water insoluble lubricants includes oils (e.g., mineral oil). Other water insoluble lubricants include, e.g., animal fats, polyoxyethylene monostearate, talc, and combinations thereof. A tablet may include an additional lubricant in an amount less than about 0.1 wt % to about 10 wt % of the tablet; about 0.1 wt % to about 8 wt % of the tablet; about 0.1 wt % to about 6 wt % of the tablet; about 0.1 wt % to about 4 wt % of the tablet; about 0.1 wt % to about 2 wt % of the tablet; about 0.1 wt % to about 1 wt % of the tablet; about 0.1 wt % of the tablet; about 0.2 wt % of the tablet; about 0.3 wt % of the tablet; about 0.4 wt % of the tablet; about 0.5 wt % of the tablet; about 0.6 wt % of the tablet; about 0.7 wt % of the tablet; about 0.8 wt % of the tablet; about 0.9 wt % of the tablet; about 1 wt % of the tablet; about 2 wt % of the tablet; about 4 wt % of the tablet; about 6 wt % of the tablet; about 8 wt % of the tablet; or about 10 wt % of the tablet.

Texturizing Agent

Tablets of the present invention may also include a texturizing agent. Tablets of the present invention may include texturizing agents of a type and amount suitable to provide a desirable texture/mouthfeel in the resulting beverage. For example, a tablet including a suitable texturizing agent may provide a resulting low calorie beverage with the texture and/or mouthfeel of a sugar-sweetened or juice-containing beverage, and may prevent the thin texture and/or mouthfeel which are often present in low calorie beverages. In some embodiments, a tablet including a suitable texturizing agent provides a resulting beverage with a desirable mouthfeel, but does not substantially slow the dissolution rate of the tablet in an aqueous solution. In some embodiments, the texture and/or mouthfeel of the resulting beverage may be quantified by a sensory evaluation using a trained panel. In some embodiments, the texture and/or mouthfeel of a resulting beverage may be quantified based on the viscosity of the resulting beverage. In some embodiments, a resulting beverage product has a viscosity at about 11° C. of about 3 mPas to about 15 mPas; about 4 mPas to about 14 mPas; about 5 mPas to about 13 mPas; about 6 mPas to about 12 mPas; about 7 mPas to about 11 mPas; about 8 mPas to about 10 mPas; about 3 mPas; about 4 mPas; about 5 mPas; about 6 mPas; about 7 mPas; about 8 mPas; about 9 mPas; about 10 mPas; about 11 mPas; about 12 mPas; about 13 mPas; about 14 mPas; or about 15 mPas.

Examples of suitable texturizing agents include but are not limited to starches, natural gums, cellulose gums, microcrystalline cellulose, methylcellulose, cellulose ethers, sodium carboxymethylcellulose, ethyl cellulose, gelatin, dextrose, lactose, sucrose, sorbitol, mannitol, polyethylene glycol, polyvinylpyrrolidone, pectins, alginates, polyacrylamides, polyvinyloxoazolidone, polyvinylalcohols and mixtures thereof.

In some embodiments, a preferable texturizing agent includes high viscosity carboxymethylcellulose ("CMC"). For example, in some embodiments, a tablet contains carboxymethylcellulose having a viscosity at 25° C. of about 2500 mPas to about 6000 mPas. In some embodiments, a tablet containing high viscosity carboxymethylcellulose may produce a beverage product, without additional sugar, having a mouthfeel similar or the same as the mouthfeel of a beverage product produced from a tablet containing a traditional carboxymethylcellulose (having a viscosity of about 900 mPas to about 1500 mPas at 25° C.) and which contains additional sugar to boost the mouthfeel. For example, a commercial orange flavored beverage produced with 0.15-0.26 g/200 ml traditional viscosity carboxymethylcellulose, having with additional viscosity/mouthfeel contributed by sugar, provides the same mouthfeel as a beverage product prepared with 0.075 g/250 ml of a high viscosity carboxymethylcellulose, without the aid of sugar to boost viscosity/mouthfeel.

In some embodiments, a tablet may include a texturizing agent in an amount of about 0.1 wt % to about 10 wt % of the tablet; about 0.1 wt % to about 8 wt % of the tablet; about 0.1 wt % to about 6 wt % of the tablet; about 0.1 wt % to about 4 wt % of the tablet; about 0.1 wt % to about 2 wt % of the tablet; about 0.2 wt % to about 1.5 wt % of the tablet; about 0.5 wt % to about 1 wt % of the tablet; about 0.1 wt % of the tablet; about 0.2 wt % of the tablet; about 0.5 wt % of the tablet; about 1 wt % of the tablet; about 1.5 wt % of the tablet; about 2 wt % of the tablet; about 3 wt % of the tablet; about 4 wt % of the tablet; about 5 wt % of the tablet; about 6 wt % of the tablet; about 7 wt % of the tablet; about 8 wt % of the tablet; about 9 wt % of the tablet; or about 10 wt % of the tablet.

Additional Ingredients

The tablet can optionally include additional ingredients, including, e.g., lubricants, color agents, clouding agents, nutritional ingredients (e.g., nutritional supplements), surfactant, and combinations thereof.

The tablet may optionally include water soluble sweeteners including, e.g., sugars such as sucrose, glucose, invert sugar, fructose, ribose, lactose, maltose, isomalt, tagatose, sucralose, and mixtures thereof, saccharin and its various salts (e.g., sodium and calcium salt of saccharin), cyclamic acid and its various salts, acesulfame potassium, dihydrochalcone, glycyrrhizin, and sugar alcohols including, e.g., erythritol, xylitol, sorbitol, sorbitol syrup, lactitol, maltitol, and mannitol, and combinations thereof. In some embodiments, preferred sweeteners include high potency sweeteners.

The tablet may include sweeteners in an amount of about 1 wt % to about 20 wt % of the tablet; about 1 wt % to about 18 wt % of the tablet; about 1 wt % to about 16 wt % of the tablet; about 1 wt % to about 14 wt % of the tablet; about 1 wt % to about 12 wt % of the tablet; about 2 wt % to about 10 wt % of the tablet; about 3 wt % to about 9 wt % of the tablet; about 4 wt % to about 8 wt % of the tablet; about 5 wt % to about 7 wt % of the tablet; about 1 wt % of the tablet; about 2 wt % of the tablet; about 3 wt % of the tablet; about 4 wt % of the tablet; about 5 wt % of the tablet; about 6 wt % of the tablet; about 7 wt % of the tablet; about 8 wt % of the tablet; about 9 wt % of the tablet; about 10 wt % of the tablet; about 12 wt % of the tablet; about 14 wt % of the tablet; about 16 wt % of the tablet; about 18 wt % of the tablet; or about 20 wt % of the tablet.

In some embodiments, the tablet includes a flavor agent, which can be any suitable flavor agent. The flavor agent imparts any suitable flavor to the composition, including, e.g., lemon (e.g., lemonade), orange, grape, tropical punch, lime, grapefruit, apple, pear, peach, strawberry, raspberry, cherry, plum, pineapple, apricot, guava, mango, papaya, tea, mint, cocoa, vanilla, almond, coffee, and combinations thereof. Suitable flavor agents may include natural and artificial flavor agents including, e.g., volatile oils, synthetic flavor oils, flavoring aromatics, oils, liquids, oleoresins and extracts derived from plants, leaves, flowers, fruits, stems and combinations thereof. Suitable flavor agents may include, e.g., citric oils, e.g., lemon, orange, grape, lime and grapefruit oils, fruit essences including, e.g., lemon, apple, pear, peach, grape, strawberry, raspberry, cherry, plum, pineapple, apricot, guava, mango, papaya, and other fruit flavors, ice tea flavoring, and combinations thereof. Other suitable flavor agents may include, e.g., aldehydes and esters (e.g., benzaldehyde (cherry, almond)), citral, i.e., alpha-citral (lemon, lime), neral, i.e., beta-citral (lemon, lime), decanal (orange, lemon), aldehyde C-8 (citrus fruits), aldehyde C-9 (citrus fruits), aldehyde C-12 (citrus fruits), tolyl aldehyde (cherry, almond), 2,6-dimethyloctanal (green fruit), 2-dodedenal (citrus, mandarin), and mixtures thereof. The flavor agents can be in a variety of forms including, e.g., solids (e.g., powders, granulations, spherical and non-spherical particles, and combinations thereof), liquids (e.g., oils), pastes, and combinations thereof. A variety of techniques are available for forming flavor agents, including, e.g., spray drying, granulating, encapsulation, and combinations thereof.

In some embodiments, useful flavor agents include a solid substrate component (i.e., a carrier) in addition to a flavor component. Some carriers are soluble in water, insoluble in water, slightly soluble in water, or sparingly soluble in water or exhibit delayed solubility in water. Useful carriers include, e.g., sucrose, glucose, lactose, levulose, fructose, maltose, ribose, arabinose, pentose, xylose, galactose, and isomalt (e.g., a mixture of glucopyranosylmannitol dihydrate and glucopyranosylsorbitol), and combinations thereof, and sugar alcohols including, e.g., sorbitol, mannitol, xylitol, lactitol, maltitol, and pentatol, and combinations thereof. Other carriers include, e.g., starches, hydrolyzed starches (e.g., maltodextrin), dextrin (e.g., water soluble and partially water soluble dextrins), cyclodextrin, and emulsifying polymers (e.g., gum arabic), pectins, xanthans, alginates, cellulose (e.g., carboxymethyl cellulose, methyl cellulose, ethyl cellulose, hydroxyethylcellulose, and hydroxypropyl cellulose), corn syrup (e.g., corn syrup solids), silicon dioxide, soy lecithin, gum arabic, modified starch (e.g., sodium starch octenyl succinates), whey protein, gelatin, butylated hydroxyanisole, butylated hydroxytoluene, and combinations thereof.

In some embodiments, a tablet includes a flavor agent in an amount of about 0.1 wt % to about 10 wt % of the tablet; about 0.1 wt % to about 9 wt % of the tablet; about 0.2 wt % to about 8 wt % of the tablet; about 0.4 wt % to about 7 wt % of the tablet; about 0.6 wt % to about 6 wt % of the tablet; about 0.8 wt % to about 5 wt % of the tablet; about 1 wt % to about 4 wt % of the tablet; about 1 wt % to about 3 wt % of the tablet; about 0.1 wt % of the tablet; about 0.2 wt % of the tablet; about 0.4 wt % of the tablet; about 0.6 wt % of the tablet; about 0.8 wt % of the tablet; about 1 wt % of the tablet; about 2 wt % of the tablet; about 3 wt % of the tablet; about 4 wt % of the tablet; about 5 wt % of the tablet; about 6 wt % of the tablet; about 7 wt % of the tablet; about 8 wt % of the tablet; about 9 wt % of the tablet; about 10 wt % of the tablet.

Suitable color agents may include, e.g., food, drug and cosmetic (FD&C) colors including, e.g., dyes, pigments, lakes, natural colorants, and derived colorants.

In some embodiments, the color agent includes a carrier in addition to the coloring component. Useful carriers may include, e.g., sucrose, glucose, lactose, levulose, fructose, maltose, ribose, arabinose, pentose, xylose, galactose, and isomalt (e.g., a mixture of glucopyranosylmannitol dihydrate and glucopyranosylsorbitol), and combinations thereof, and sugar alcohols including, e.g., sorbitol, mannitol, xylitol, lactitol, maltitol, and pentatol, and combinations thereof. Other suitable carriers may include, e.g., starch, modified starch, hydrolyzed starches (e.g., maltodextrin), dextrin (e.g., water soluble and partially water soluble dextrins), and emulsifying polymers (e.g., gum arabic), pectins, xanthans, alginates, cellulose (e.g., carboxymethyl cellulose, methyl cellulose, ethyl cellulose, hydroxyethylcellulose, and hydroxypropyl cellulose), corn syrup (e.g., corn syrup solids), silicon dioxide, soy lecithin, butylated hydroxyanisole, butylated hydroxytoluene, and combinations thereof.

A tablet may include a color agent in any suitable amount, such as about 0.05 wt % to about 6 wt % of the tablet; about 0.07 wt % to about 5 wt % of the tablet; about 0.09 wt % to about 5 wt % of the tablet; about 0.1 wt % to about 5 wt % of the tablet; about 0.2 wt % to about 4 wt % of the tablet; about 0.3 wt % to about 3 wt % of the tablet; about 0.4 wt % to about 2 wt % of the tablet; about 0.5 wt % to about 1.5 wt % of the tablet; about 0.05 wt % of the tablet; about 0.07 wt % of the tablet; about 0.09 wt % of the tablet; about 0.1 wt % of the tablet; about 0.2 wt % of the tablet; about 0.3 wt % of the tablet; about 0.4 wt % of the tablet; about 0.5 wt % of the tablet; about 0.6 wt % of the tablet; about 0.7 wt % of the tablet; about 0.8 wt % of the tablet; about 0.9 wt % of the tablet; about 1 wt % of the tablet; about 1.5 wt % of the tablet; about 2 wt % of the tablet; about 3 wt % of the tablet; about 4 wt % of the tablet; or about 5 wt % of the tablet.

In some embodiments, a tablet may include one or more clouding agent. Clouding agents may provide opacity to a resulting beverage product, for example, which may mimic the cloudiness of a natural fruit juice. Examples of suitable clouding agents may include but are not limited to titanium dioxide; and/or a composition including titanium dioxide, maltodextrin, gums, etc. A tablet may include a clouding agent in an amount of about 0.1 wt % to about 10 wt % of the tablet; about 0.5 wt % to about 8 wt % of the tablet; about 1 wt % to about 6 wt % of the tablet; about 1.5 wt % to about 4 wt % of the tablet; about 2 wt % to about 3 wt % of the tablet; about 0.1 wt % of the tablet; about 0.5 wt % of the tablet; about 1 wt % of the tablet; about 1.5 wt % of the tablet; about 2 wt % of the tablet; about 2.5 wt % of the tablet; about 3 wt % of the tablet; about 4 wt % of the tablet; about 5 wt % of the tablet; about 6 wt % of the tablet; about 7 wt % of the tablet; about 8 wt % of the tablet; about 9 wt % of the tablet; or about 10 wt % of the tablet.

The tablet optionally includes a desiccant. A variety of desiccants can be used in the effervescent tablet including, e.g., potassium carbonate, sodium carbonate, calcium carbonate, magnesium oxide, and combinations thereof. Desiccant may be present in tablets of some embodiments of the present invention in an amount of less than about 5 wt % of the tablet; less than about 3 wt % of the tablet; or less than about 0.5% by weight of the tablet.

A tablet may also contain added nutrients, vitamins, and/or minerals, such as but not limited to ascorbic acid, iron, vitamin B2, vitamin B3, vitamin B6, vitamin B9, and/or vitamin A. Tablets may contain any suitable amount of such nutrients, vitamins, and/or minerals.

Tablets of some embodiments of the present invention produce low calorie beverages. In some embodiments, a tablet of the present invention produces a beverage product with about 0 calories to about 50 calories per serving; about 0 calories to about 45 calories per serving; about 0 calories to about 40 calories per serving; about 1 calorie to about 39 calories per serving; less than about 50 calories per serving; less than about 45 calories per serving; less than about 40 calories per serving; less than about 35 calories per serving; less than about 30 calories per serving; less than about 25 calories per serving; less than about 20 calories per serving; less than about 15 calories per serving; less than about 10 calories per serving; or less than about 5 calories per serving.

Tablet Production

Tablets of the present invention may be produced with any suitable tablet mass production equipment and processes. Examples of useful tableting processes for effervescent compositions are described in Pharmaceutical Dosage Forms, Vol. 1, (Herbert A. Lieberman et al. eds, 2$^{nd}$ ed. 1989) and are incorporated herein. The tablets may be manufactured in an automated process in which multiple dies of a tablet press are filled sequentially or simultaneously with the effervescent composition, two punches compress the effervescent composition to form the tablet(s), and then the tablet(s) is ejected from the die.

The tablet may then be placed in packaging material, which may be sealed to form an air tight sealed package. Packaging material may contain desiccant, such as embedded within the film, in order to provide additional protection from humidity through distribution and storage. The packaged tablet can be further processed by conveying it to other processing stations including, e.g., additional packaging stations for further packaging, e.g., boxing and bagging.

The tablet manufacturing and initial packing operations are preferably performed in a controlled environment in which the temperature and humidity are controlled. In some embodiments, the controlled environment has less than 18 grains, less than 16 grains, or even less than 15 grains of moisture per pound of air at a temperature of 72° F. (22.2° C.).

During preparation of the composition to be tableted, ingredients may be sieved as necessary prior to combining the ingredients by mixing. In some embodiments, a lubricant, such as corn oil, may be initially mixed with the granular ingredients of the formulation, such as citric acid and/or ascorbic acid, before adding and mixing in the remaining ingredients of the formulation. In another embodiment, mixing may be performed in a one-step process wherein half of the acid is placed into the mixer, the other ingredients (minus the oil lubricant) are layered on top, the other half of the acid is placed on top and the oil lubricant is then poured on top, making sure that none of the oil lubricant touches the other ingredients. The whole batch may then be mixed for 10-15 minutes with no additional ingredient inclusions.

Such methods may help to avoid over-mixing which could potentially result in the particles being coated so much that solubility would be hindered and thus dissolve time would increase. Similarly, such methods of mixing may prevent clumping of the lubricant, as may be observed when the lubricant is added to a mixing bowl containing all of the other ingredients in the formulation. Ensuring that the lubricant, such as corn oil, is not clumped on certain ingredients may also help to yield a uniform beverage without chunks of oil-laden colorant, for example, and prevents clusters of oil.

The tablet may be prepared in of a variety of sizes. For example, a suitable tablet may have a diameter of at least about 10 mm; at least about 15 mm; from about 16 mm to about 30 mm; from about 16 mm to about 25 mm; about 19 mm; or about 21 mm; a weight of from about 1 g to about 6 g; from about 1.5 g to about 5 g; from about 2.0 g to about 4 g; from about 2.1 to about 3.0 g; or from about 2.1 g to about 2.4 g; and a hardness of about 2 kP to about 20 kP; about 3 kP to about 18 kP; about 4 kP to about 16 kP; about 5 kP to about 14 kP; about 6 kP to about 12 kP; about 7 kP to about 10 kP; about 2 kP; about 4 kP; about 6 kP; about 8 kP; about 10 kP; about 12 kP; about 14 kP; about 16 kP; about 18 kP; or about 20 kP.

Tablet size and hardness may be assessed using, for example, a Dr. Schleuniger model 8M hardness tester which measures the force to break a tablet in half by applying force normal to the tablet edge and thereby producing a value in kiloponds (kP), as well as measuring the diameter of the tablet.

Tablets may be assessed for appearance, such as the absence of chips and defects, uniform color, look of the beverage and residue on the glass, and flavor in the lab without the use of specialty equipment or panels.

Tablet Use

A suitable method of using the effervescent tablets includes dissolving a tablet in an aqueous liquid, e.g., an eight ounce glass of water or a bottle of water, to form an aqueous beverage solution. After addition of the tablet to an aqueous liquid, the composition optionally can be stirred to facilitate dispersion and/or dissolution in the aqueous liquid.

The tablet may be formulated so that the rate of disintegration is similar to or increased (i.e., total disintegration time is decreased) as compared to traditional products when the tablet is placed in a cold aqueous liquid, room temperature aqueous liquid, hot aqueous liquid, or a combination thereof. As used herein, dissolution and self-dispersion time are determined by measuring the appropriate amount of refrigerated water (approximately 45° F.) and measuring the time from the moment the tablet is placed in the water until the fizzing action ceases. In some embodiments, a tablet added to 250 mL of aqueous liquid will self-disperse in about 10 seconds to about 6 minutes; about 30 seconds to about 5 minutes; about 1 minute to about 4 minutes; about 2 minutes to about 3 minutes; about 10 seconds; about 30 seconds; about 1 minute; about 2 minutes; about 3 minutes; about 4 minutes; about 5 minutes; or about 6 minutes.

In some embodiments, tablets of the present invention unexpectedly exhibit similar dissolution rates as previous formulations but include significantly lower levels of bicarbonates. In some embodiments, tablets of the present invention unexpectedly exhibit similar dissolution rates as previous formulations but include 70% less bicarbonates. A reduction of bicarbonates in a tablet formulation may be desirable because it can provide decreased saltiness in the resulting beverage. For example, tablets of some embodiments of the present invention include about 135 mg to about 160 mg per serving sodium and/or potassium and dissolved in less than three minutes. Among commercial samples containing less than 200 mg/serving of sodium and/or potassium, dissolve time is greater than five minutes.

EXAMPLES

Example 1

Tablets were prepared according to the following formulation:

| Mango Tablets | |
|---|---|
| | Wt % |
| Citric Acid | 41.844 |
| Potassium Bicarbonate | 13.017 |
| Sodium Bicarbonate | 10.414 |
| Aspartame | 4.821 |
| Acesulfame Potassium | 1.266 |
| Sorbitol | 16.392 |
| Mango flavor | 1.929 |
| Ascorbic Acid | 2.700 |
| Suspended titanium dioxide | 2.170 |
| Magnesium Oxide | 0.289 |
| FD&C Yellow #5 powder | 0.868 |
| FD&C Yellow #6 powder | 0.096 |

| Mango Tablets | |
|---|---|
| | Wt % |
| Corn oil | 0.579 |
| CMC | 3.616 |
| TOTAL | 100.000 |

Tablets were prepared according to the formulation above having a 19 mm diameter, weighing 2.1 g, and having a hardness of 4-8 kP. Such tablets dissolved in 250 ml of 45° F. water in 1.5 to 3 minutes.

Example 2

Tablets were prepared according to the following formulations to compare the impact of bicarbonate levels on the tablets and resulting beverage:

Bicarbonate Formulation 1:

| Mango (100% System) | |
|---|---|
| | Wt % |
| Citric Acid | 40.2200 |
| Potassium Bicarbonate | 25.0000 |
| Sodium Bicarbonate | 8.0000 |
| Aspartame | 3.0500 |
| Acesulfame Potassium | 0.7700 |
| Sorbitol | 18.0000 |
| Mango flavor | 0.8500 |
| Ascorbic Acid | 2.0700 |
| Suspended titanium dioxide | 1.8000 |
| Magnesium Oxide | 0.2100 |
| FD&C Yellow #5 powder | 0.6500 |
| FD&C Yellow #6 powder | 0.0700 |
| Lubricant | 0.5000 |
| TOTAL | 101.1900 |

Bicarbonate Formulation 2:

| Mango (40% System) | |
|---|---|
| | Wt % |
| Citric Acid | 29.2300 |
| Potassium Bicarbonate | 10.0000 |
| Sodium Bicarbonate | 8.0000 |
| Aspartame | 3.0500 |
| Acesulfame Potassium | 0.7700 |
| Sorbitol | 18.0000 |
| Mango flavor | 0.8500 |
| Ascorbic Acid | 2.0700 |
| Suspended titanium dioxide | 1.8000 |
| Magnesium Oxide | 0.2100 |
| FD&C Yellow #5 powder | 0.6500 |
| FD&C Yellow #6 powder | 0.0700 |
| Lubricant | 0.5000 |
| TOTAL | 75.2000 |

Bicarbonate Formulation 3:

Mango (70% System)

| | Wt % |
|---|---|
| Citric Acid | 34.7250 |
| Potassium Bicarbonate | 17.5000 |
| Sodium Bicarbonate | 8.0000 |
| Aspartame | 3.0500 |
| Acesulfame Potassium | 0.7700 |
| Sorbitol | 18.0000 |
| Mango flavor | 0.8500 |
| Ascorbic Acid | 2.0700 |
| Suspended titanium dioxide | 1.8000 |
| Magnesium Oxide | 0.2100 |
| FD&C Yellow #5 powder | 0.6500 |
| FD&C Yellow #6 powder | 0.0700 |
| Lubricant | 0.5000 |
| TOTAL | 88.1950 |

Bicarbonate Formulation 4:

Mango

| | % |
|---|---|
| Citric Acid | 43.413 |
| Potassium Bicarbonate | 13.506 |
| Sodium Bicarbonate | 10.805 |
| Aspartame | 5.002 |
| Acesulfame Potassium | 1.313 |
| Sorbitol | 17.007 |
| Mango flavor | 2.001 |
| Ascorbic Acid | 2.801 |
| Suspended titanium dioxide | 2.251 |
| Magnesium Oxide | 0.300 |
| FD&C Yellow #5 powder | 0.900 |
| FD&C Yellow #6 powder | 0.100 |
| Lubricant | 0.600 |
| CMC | 3.752 |
| TOTAL | 103.752 |

Production and dissolution of tablets according to the formulations above demonstrated that bicarbonate reduction can be achieved without an increase in dissolve time. The tablets also demonstrated that salty/metallic note that is characteristic of carbonates/bicarbonates was greatly reduced as the level of bicarbonates was reduced. Mouthfeel was not reduced in terms of viscosity but rather had reduced "slipperiness" that can be attributed to the quasi-medicinal effect of bicarbonates.

Example 3

Tablets were prepared according to the following formulations to compare the impact of high viscosity carboxymethylcellulose on the tablet and resulting beverage as compared to xanthan/guar gums:

CMC Formulation 1:

Mango

| | % |
|---|---|
| Citric Acid | 40.482 |
| Potassium Bicarbonate | 13.853 |
| Sodium Bicarbonate | 11.083 |
| Aspartame | 4.105 |
| Acesulfame Potassium | 1.077 |
| Sorbitol | 17.445 |
| Mango flavor | 1.231 |
| Ascorbic Acid | 2.873 |
| Suspended titanium dioxide | 2.309 |
| Magnesium Oxide | 0.308 |
| FD&C Yellow #5 powder | 0.924 |
| FD&C Yellow #6 powder | 0.103 |
| Lubricant | 0.616 |
| Sodium CMC | 3.592 |
| TOTAL | 100.000 |

CMC Formulation 2:

Mango

| | % |
|---|---|
| Citric Acid | 44.728 |
| Potassium Bicarbonate | 13.310 |
| Sodium Bicarbonate | 10.648 |
| Aspartame | 4.930 |
| Acesulfame Potassium | 1.294 |
| Sorbitol | 16.760 |
| Mango flavor | 1.479 |
| Ascorbic Acid | 2.761 |
| Suspended titanium dioxide | 2.218 |
| Magnesium Oxide | 0.296 |
| FD&C Yellow #5 powder | 0.887 |
| FD&C Yellow #6 powder | 0.099 |
| Lubricant | 0.592 |
| CMC | 0.000 |
| Guar | 0.000 |
| Xanthan | 0.000 |
| TOTAL | 100.000 |

CMC Formulation 3:

Mango

| | % |
|---|---|
| Citric Acid | 41.945 |
| Potassium Bicarbonate | 13.049 |
| Sodium Bicarbonate | 10.439 |
| Aspartame | 4.833 |
| Acesulfame Potassium | 1.269 |
| Sorbitol | 16.432 |
| Mango flavor | 1.692 |
| Ascorbic Acid | 2.706 |
| Suspended titanium dioxide | 2.175 |
| Magnesium Oxide | 0.290 |
| FD&C Yellow #5 powder | 0.870 |
| FD&C Yellow #6 powder | 0.097 |
| Lubricant | 0.580 |
| CMC | 3.625 |
| TOTAL | 100.000 |

Production and dissolution of tablets according to the formulations above demonstrated that CMC improves mouthfeel in a resulting beverage than xanthan and/or guar gums. It was found that the CMC provided a beverage product with a mouthfeel and texture that was more viscous and less slimy than that provided by xanthan and guar gums.

Further, it was found that the addition of the CMC did not substantially increase the dissolution time of the tablets in water.

Example 4

Tablets were prepared according to the following formulations to compare the impact of using corn oil as a lubricant on the tablet and the resulting beverage:

Lemonade Formulas

|  | Oil Formula | | PEG Formula | |
|---|---|---|---|---|
|  | % | g/tablet | % | g/tablet |
| Citric Acid Fine Granular | 60.2 | 1.404 | 58.7 | 1.404 |
| Potassium Bicarbonate | 13.7 | 0.320 | 13.4 | 0.320 |
| Sodium Bicarbonate | 6.5 | 0.152 | 6.4 | 0.152 |
| Aspartame | 4.3 | 0.100 | 4.2 | 0.100 |
| Binder | 9.0 | 0.210 | 8.8 | 0.210 |
| Lemon Flavor 1 | 1.7 | 0.039 | 1.6 | 0.039 |
| Sodium Carbonate | 1.1 | 0.025 | 1.0 | 0.025 |
| Potassium Carbonate | 1.1 | 0.025 | 1.0 | 0.025 |
| Sucralose | 1.0 | 0.023 | 1.0 | 0.023 |
| Oil | 0.5 | 0.012 | 0.0 | 0.000 |
| PEG | 0.0 | 0.000 | 3.0 | 0.073 |
| Lemon Flavor 2 | 0.3 | 0.008 | 0.3 | 0.008 |
| Ascorbic Acid | 0.3 | 0.007 | 0.3 | 0.007 |
| Sodium Benzoate | 0.1 | 0.002 | 0.1 | 0.002 |
| Magnesium Oxide | 0.2 | 0.005 | 0.2 | 0.005 |
| FD&C Yellow #5 powder | 0.0 | 0.00050 | 0.0 | 0.00050 |
| TOTAL | 100 | 2.333 | 100 | 2.394 |

Orange Formulas

|  | Oil Formula | | PEG Formula | |
|---|---|---|---|---|
|  | % | g/table | % | g/tablet |
| Sodium Bicarbonate Effersoda | 25.44% | 0.496 | 25.44% | 0.496 |
| Potassium Bicarbonate | 6.16% | 0.12 | 6.16% | 0.12 |
| Citric | 40.17% | 0.783 | 40.17% | 0.783 |
| Sorbitol | 18.72% | 0.365 | 15.39% | 0.300 |
| Orange flavor | 4.16% | 0.081 | 4.16% | 0.081 |
| Sucralose | 2.31% | 0.045 | 2.31% | 0.045 |
| Acesulfame Potassium | 0.56% | 0.011 | 0.56% | 0.011 |
| Corn Oil | 0.50% | 0.0095 | 0.00% | 0.0000 |
| PEG8000 | 0.00% | 0.0000 | 3.80% | 0.0740 |
| Suspended titanium dioxide | 0.84% | 0.0163 | 0.84% | 0.0163 |
| FD&C Yellow No. 5 | 0.21% | 0.004 | 0.21% | 0.004 |
| FD&C Yellow No. 6 | 0.06% | 0.001 | 0.06% | 0.001 |
| Vitamin C | 0.89% | 0.017 | 0.89% | 0.017 |
| TOTAL | 100.00% | 1.949 | 100.00 | 1.949 |

Modifications made to the basic effervescent tablet formulas in Table 1 and subsequent tablet properties:

|  | Binder | Lubricant | Tablet appearance | Dissolve time | Comments |
|---|---|---|---|---|---|
| Lemonade | 9% Sorbitol | 0.5% Mineral oil | Chipping | 3:40 | Under-lubricated, residue ring |
| Lemonade | 18% Sorbitol | 0.5% Mineral oil | Chipping | 4:20 | Under-lubricated, residue ring |
| Lemonade | 18% Sorbitol | 0.5% + 1 g Mineral oil | Chipping | 4:20 | Under-lubricated, delayed chipping onset versus 0.5% Mineral oil, residue ring |
| Lemonade | 18% Sorbitol | 0.5% + 2 g Mineral oil | Shiny | 4:20 | Well-lubricated, residue ring |
| Lemonade | 9% Sorbitol | 0.5% Mineral oil on Citric acid only | Chipping | 4:00 | Under-lubricated, residue ring |
| Lemonade | 18% Sorbitol | 0.5% Corn oil | Slightly dusty and matte but well-formed | 3:45 | Borderline Under/Well-lubricated, residue ring |
| Lemonade | 18% Sorbitol | 0.55% Corn oil | Slightly dusty and matte but well-formed | 3:45 | Negligible improvement over 0.5% Corn oil formula, residue ring |
| Lemonade | 9% Sorbitol | 3% Ultra-fine and Fine blend PEG | Chipping | 4:15 | Under-lubricated, residue ring |
| Lemonade | 18% Sorbitol | 4% Ultra-fine and Fine blend PEG | Chipping | 5:15 | Under-lubricated, residue ring |
| Lemonade | 13.5% Sorbitol | 1.5% Ultra-fine and Fine blend PEG, 0.275% Corn oil | Shiny | 2:30 | Well-lubricated, residue ring |
| Orange | 15.4% Sorbitol | 3.8% Granular PEG | Chipping | 3:00 | Under-lubricated, very little foaming. Ejection force at 1800 N. |
| Orange | 18.7% Sorbitol | 0.5% Corn oil | Shiny | 2:15 | Well-lubricated, very little foaming. Ejection force at 300 N. |
| Orange | 18.7% Sorbitol | 0.5% Corn oil | Shiny (>1000 tablets*) | 2:15 | Well-lubricated, very little foaming, could probably go up in lubricant a little more (to 0.55% or 0.6%) |

The results demonstrate that the use of corn oil as a lubricant in the tablet formulations results in well-formed tablets with lower dissolution times as compared to formulations containing the other tested lubricants.

It will be appreciated by those skilled in the art that changes could be made to the exemplary embodiments shown and described above without departing from the broad inventive concept thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and features of the disclosed embodiments may be combined.

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

The claims directed to the method of the present invention should not be limited to the performance of their steps in the order written except where expressly stated, and one skilled in the art can readily appreciate that the steps may be varied and still remain within the spirit and scope of the present invention.

We claim:

1. A beverage tablet comprising:
    an effervescent system comprising (i) a base selected from one or more carbonates, bicarbonates, or combinations thereof, (ii) an acid selected from citric acid, aspartic acid, malic acid, adipic acid, tartaric acid, fumaric acid, succinic acid, and mixtures thereof, wherein the base is present in an amount of about 5 wt % to about 40 wt % of the tablet; and a texturizing agent in an amount of about 0.1 wt % to about 4 wt % of the tablet,
    wherein the texturizing agent is a high viscosity carboxymethylcellulose having a viscosity at 25° C. of about 2500 mPas to about 6000 mPas,
    wherein the beverage exhibits a texture and/or mouthfeel traditionally associated with a sugar-sweetened or juice-containing beverage,
    and wherein the tablet self-disperses in an aqueous liquid in less than about three minutes to produce a beverage that is free of visible particles floating after the tablet has dissolved.

2. The beverage tablet of claim 1, wherein the beverage comprises potassium and/or sodium in an amount of less than about 200 mg per sodium.

3. The beverage tablet of claim 1, wherein the beverage is a low calorie beverage.

4. The beverage tablet of claim 1, comprising a lubricant in an amount of about 0.1 wt % to about 8 wt % of the tablet.

5. The beverage tablet of claim 4, wherein the lubricant comprises corn oil.

6. A method of preparing a beverage comprising adding the beverage tablet of claim 1 to an aqueous liquid.

7. The beverage tablet of claim 1, wherein the beverage has a viscosity at 11° C. of about 3 mPas to about 15 mPas.

8. The beverage table of claim 1, wherein the acid is present in an amount of about 20 wt % to about 60 wt % of the tablet.

9. A method of preparing a beverage tablet comprising combining:
    (a) an effervescent system comprising (i) a base selected from one or more carbonates, bicarbonates, or combinations thereof, (ii) an acid selected from citric acid, aspartic acid, malic acid, adipic acid, tartaric acid, fumaric acid, succinic acid, and mixtures thereof, wherein the base is present in an amount of about 5 wt % to about 40 wt % of the tablet;
    (b) a lubricant in an amount of about 0.1 wt % to about 8 wt % of the tablet; and
    (c) a texturizing agent in an amount of about 0.1 wt % to about 10 wt % of the tablet, wherein the texturizing agent is a high viscosity carboxymethylcellulose having a viscosity at 25° C. of about 2500 mPas to about 6000 mPas;
    to prepare a beverage tablet, wherein the tablet self-disperses in an aqueous liquid in less than about three minutes to produce a beverage that is free of visible particles floating after the tablet has dissolved.

10. The method of claim 9, wherein the lubricant comprising corn oil.

11. The method of claim 9, wherein the texturizing agent comprises carboxymethylcellulose.

12. The method of claim 9, wherein the texturing agents is present in the effervescent system in an amount of about 0.1 wt % to about 4 wt %.

* * * * *